Feb. 19, 1957 W. MÜLLER 2,782,041

MAGNETIC SOUND RECORDING AND REPRODUCING DEVICE

Filed Jan. 12, 1951 4 Sheets-Sheet 1

Inventor
Willy Müller
By
Singer Stern & Carlberg
attys

Feb. 19, 1957 W. MÜLLER 2,782,041

MAGNETIC SOUND RECORDING AND REPRODUCING DEVICE

Filed Jan. 12, 1951 4 Sheets-Sheet 2

Inventor
Willy Müller
by
Singer, Stern & Carlberg
attys

Feb. 19, 1957 W. MÜLLER 2,782,041

MAGNETIC SOUND RECORDING AND REPRODUCING DEVICE

Filed Jan. 12, 1951 4 Sheets-Sheet 3

Inventor
Willy Müller
By
Singer, Stern & Carlberg
Attys

Feb. 19, 1957 W. MÜLLER 2,782,041

MAGNETIC SOUND RECORDING AND REPRODUCING DEVICE

Filed Jan. 12, 1951 4 Sheets-Sheet 4

Inventor
Willy Müller
By
Singer, Stern & Carlberg
attys.

2,782,041

MAGNETIC SOUND RECORDING AND REPRODUCING DEVICE

Willy Müller, Zurich, Switzerland, assignor to Internova Trust, Vaduz, Principality of Liechtenstein Application January 12, 1951, Serial No. 205,646

8 Claims. (Cl. 274—4)

The invention relates to a magnetic sound recording and reproducing device which is particularly suitable for the recording of broadcast transmissions (the spoken word and music) as well as for the repeated reproduction of such broadcasting, and also as a substitute for the disc sound record devices as hitherto used.

It is known in instruments of this kind to move an endless comparatively wide band as a carrier of a layer of finely divided magnetizable particles by a driven roller, while a sound-head, which is designed to act on the carrier layer of the band on the principle of longitudinal magnetizing, is guided by means of a threaded guide spindle transversely to the direction of movement of the band. Thereby a helical sound track is recorded on the sound carrier band.

The invention has the principal object of providing a safe and accurate guidance as well as a ready interchangeability of the sound carrier band.

According to the invention the driven roller is constructed as a friction drive roller for the sound carrier band, and adjustable means are arranged on a cover capable of being tilted up, which in the closed position of the cover cooperate with the driven roller, with a freely rotatable guide roller and with the sound carrier band as a friction drive for the latter, while with the cover tilted up the sound carrier band rests freely upon the said rollers of the casing for the purpose of being readily exchangeable.

It is advantageous both from the structural point of view as with a view of saving the active sound carrier layer, if the sound-head is supported by the guide spindle in such a manner that its pole pieces act from below on to the inner face of the sound carrier band which is fitted between the two rollers in the casing. Conveniently release means are provided by which the sound-head carrier can be brought out of operative engagement with the thread of the guide spindle, as well as shifting means, by which the disengaged sound-head can be freely shifted along the guide spindle.

Since with an instrument according to the invention no guidance of the sound-head along grooves cut into the sound carrier is provided, but a guidance of the sound-head is provided by the guide spindle thread, fine adjustment means are conveniently arranged by means of which the sound-head can be progressively shifted without steps at least in its operative position and at least one pitch of the screw thread of the spindle, whereby always an accurate adjustment of the sound-head on to the centre of a recorded sound track is made possible which is very important for sound reproduction.

With particular advantage the guide spindle is positively driven from the driving roller through a toothed gearing in order that an accurately predetermined ratio between the speed of the band and the speed of shifting the sound-head can be enforced.

The driving roller is preferably driven through a noiseless friction drive from the driving motor. For the purpose of achieving a uniform number of revolutions it can be provided with an inertia mass.

These and other advantageous measures will be explained in what follows with reference to the attached drawings which show an embodiment of the invention by way of example.

It will be understood that while I have described what may be considered as a preferable embodiment of my invention, I do not limit myself to the precise conditions or proportions herein set forth, as they may be varied by those skilled in the art in accordance with the particular purposes for which they are intended, and the conditions under which they are to be utilized.

Figures 1, 2:
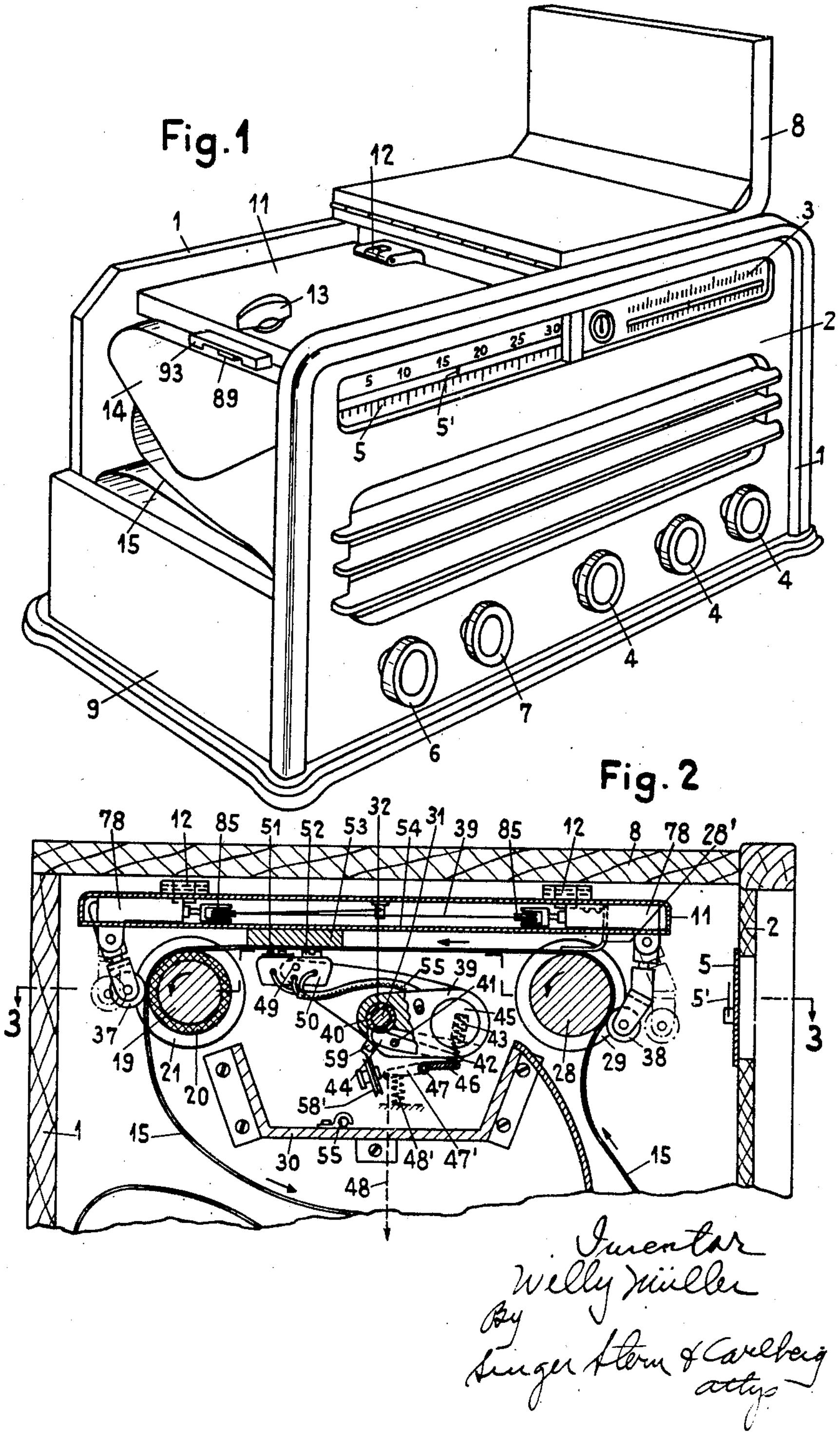
Fig. 1 is a perspective view of an appliance according to the invention in conjunction with a broadcasting device.
Fig. 2 is a cross section through the device on the line 2—2 of Fig. 3.

The device according to Fig. 1 is constructed as a home instrument by means of which wireless or "wired wireless" broadcasts can be listened to at will in the usual manner and, if desired, at the same time recorded magnetically. On the other hand, recorded broadcasts can be reproduced via the sound amplifier and the loud speaker of the instrument.

The instrument consists of an outer casing 1 in the right hand side of which the instrument for connection to the mains, the high frequency amplifier and demodulation part, the sound amplifier and the loud speaker are housed, while the mechanical components of the instrument, which are essential for the present invention, are arranged in the part of the casing which in the figure is on the left hand side in front.

On the front wall 2 of the casing there is a scale 3 visible on the right hand side, which is associated with the receiver part of the instrument and which indicates the station and wavelength received. Below said scale there are arranged three operating knobs 4, 4, 4, which act in the usual manner on the electrical switching members and on the tuning elements of the receiver part. One of these knobs 4 has three switching positions: a first position connecting the input of the sound amplifier to the wireless receiver and the output thereof to the loud speaker for direct acoustic wireless reception, a second position connecting the input of the sound amplifier to the wireless receiver and the output thereof to the transducer head of the recording and reproducing part and switching-on the electric motor thereof for recording the wireless transmission on the sound track carrier band, and a third position connecting the input of the said amplifier to the said transducer head and the output thereof to the said loud speaker and switching-on the said electric motor for reproduction of the recorded sound track.

The scale 5 visible on the left hand side on the front wall 2 is associated with the recording and reproducing part and shows the actual position of the sound-head on the guide spindle, and thereby also its position relative to the sound carrier band. When recording a broadcast on an inserted band, the initial and the end-position of the pointer 5' on the scale 5 can be noted, so that upon a later reproduction of this broadcast the sound-head can be brought directly into the starting position concerned.

For this purpose the operating knob 6 is used, while the operating knob 7 serves for the operation of fine-adjustments means. The manner of operation of these two operating knobs will be explained later more in detail.

An angular lid 8 capable of being tilted-up exposes in its open position as illustrated the upper part of the left hand side transverse wall 9 and the left hand side of the top face of the casing 1. Accordingly a cover 11 is visible, which is capable of being tilted-up about hinges 12, and of being secured in the closed position as illustrated by a closure catch 13 on a stationary gear box 14. Of the sound carrier band 15 in Fig. 1 only the freely pending part is visible.

The structural arrangement of the left hand side part of the appliance will now be described more in detail with reference to Figs. 2 and 3. In the transverse intermediate wall 16 the shaft 18 of a roller 19 is journalled rotatably by means of a bearing 17. This roller is constructed as a friction drive roller for the sound carrier band 15, and is accordingly covered on its surface with a soft rubber layer 20. Two flanges 21 serve for the accurate guidance of the sound carrier band.

The shaft 18 is extended back beyond the intermediate wall 16 and carries there an inertia mass 22 which is designed to secure its uniform rotation.

This inertia mass 22 is driven by the driving shaft 23 of a motor 24 through a rubber-clad friction wheel 25.

Parallel to the driving roller 19, the guide roller 28 is journalled in a bearing 26 on the intermediate wall 16, which roller is freely rotatable on the shaft 27 and is provided with guide flanges 29.

The shafts 18 and 27 of the two rollers 19 and 28 are both journalled cantilever-fashion in the intermediate wall 16 of the casing, and carry in turn on their free ends the gear box 14 which is also visible in Fig. 1. In order to relieve the bearings 17 and 26, a cup shaped tray 30 is attached, also cantilever-fashion to the intermediate wall 16, and supports on its free end the gear box 14.

Between the two rollers 19 and 28 of the casing there is moreover rotatably journalled a guide spindle 31 which is provided with trapezium thread (Acme thread), which guide spindle is positively driven from the driving roller 19 via the toothed gear wheels 33, 34, 35, 36.

Figure 3:
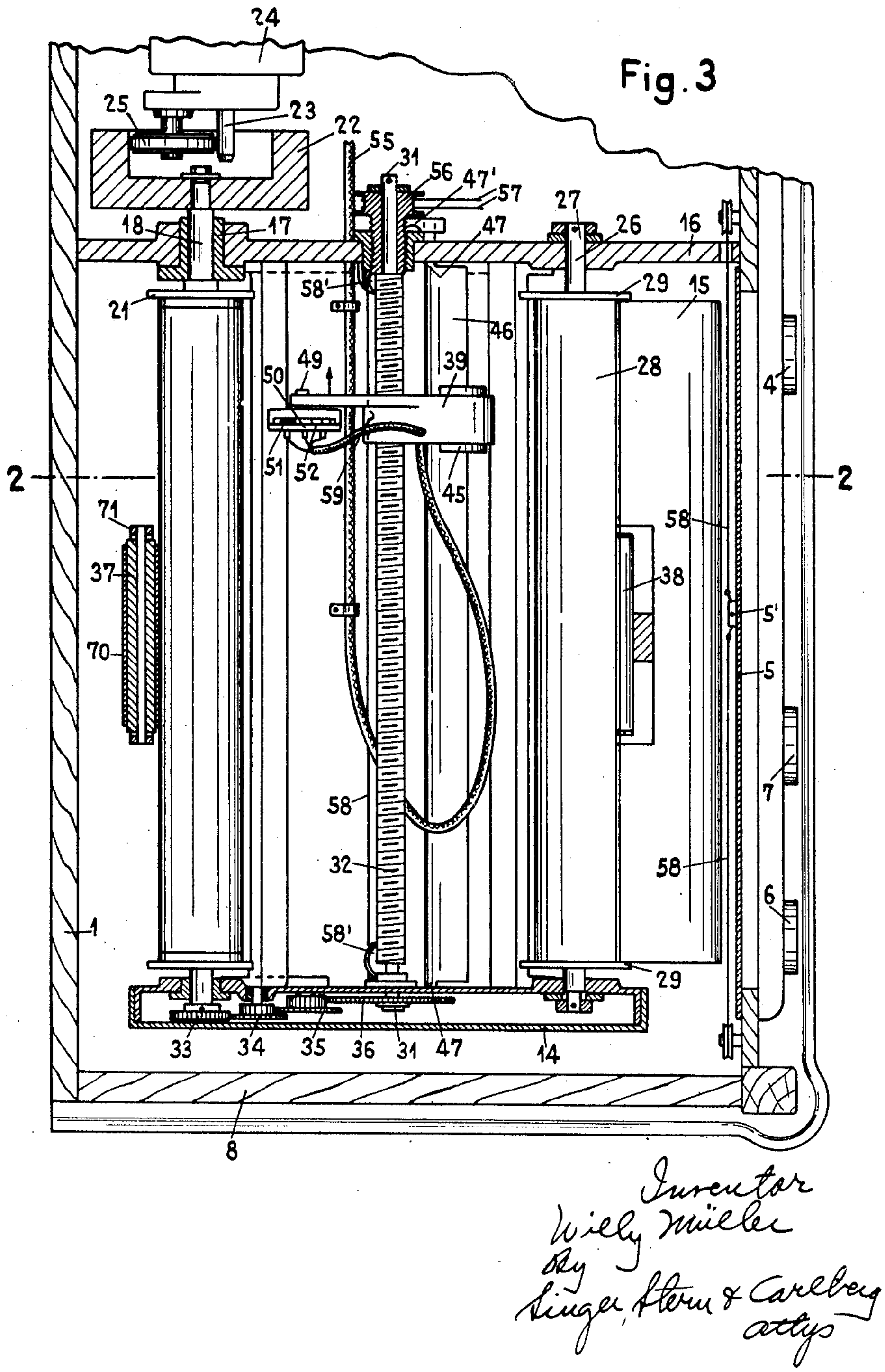
Fig. 3 is a section on the line 3—3 of Fig. 2.

On the cover 11, adjustable tensioning rollers 37 and 38 are arranged, which in the tensioning position as illustrated in Figs. 2 and 3 in full lines bear resiliently against the driving roller 19 and the guide roller 28, respectively, and which thereby tension the sound carrier band 15 between the said rollers. The tensioning rollers 37 cooperates with the driving roller 19 and the sound-carrier band 15 as a friction drive for the latter, so that the components move in the direction of the arrows. The action of the tensioning roller 38 is supported by the leaf springs 28' which are likewise arranged on the cover 11.

By turning the closure catch 13 about 90° a string-drive 39 in the cover 11 acts on the tensioning rollers 37 and 38 in such a manner, that the same are rocked into the release position as shown in Fig. 2 in dash-dotted lines, in which they release the band 15. The cover 11 can then be swung up, whereupon the band 15 lies freely on the rollers 19 and 28 and can be taken out over the gear box 14 for the purpose of being replaced by another one.

On the guide spindle 31 a sound-head carrier 39 is arranged shiftable and tiltable. It is provided, to wit, with a smooth cylindrical bore 40 which allows per se its being freely shifted longitudinally over the thread of the guide spindle 32.

Now a double-armed lever is pivotally mounted in the carrier 39 at 41 the arm 42 of which is under the action of the compression spring 43, so that this spring tends to bring the lever arm 44 into engagement with the thread 32 of the spindle 31 through a slot in the wall of the bore 40. The sound head carrier 39 which is provided with a loading weight 45 lies on a supporting rail 46 which extends over the full length of the spindle 31 parallel to the same, and which is pivoted at 47 in the partition wall 16 and in the gear box 14. An arm 47' of this supporting rail is under the action of a string-drive 48. In the operative position as shown in Fig. 2 the lever arm 44 is in engagement with the thread 32 of the spindle, so that the carrier 39 as a whole is shifted along the spindle 31 when the same is rotated. On a pivot pin 49 of the carrier 39 a combined sound and effacer head 50 is tiltably pivoted in such a manner that its sound head pole piece 51 and its effacer pole piece 52 bear resiliently against the underside of the sound barrier band 15.

When the string-drive 48 is operated against the force of the spring 48', the sound head carrier 39 can be brought out of operative engagement with the thread 32 of the spindle 31. This is effected thereby that the supporting rail 46 and accordingly also the sound head carrier 39 are rocked in an anticlockwise direction, whereby the supporting rail 46 acts firstly on the arm 42 of the said lever, so that its arm 44 gets out of engagement with the thread of the spindle. At the same time the sound-head 50 is lowered off the sound carrier band 15. In the free position attained thereby the carrier 50 can be adjusted at will along the threaded spindle 31 by means of a string-drive 58 which at 59 is secured to the carrier 50 and which is passed over the pulleys 58'. The string-drive 58 acts also on the pointer 5' so that the position of the sound-head can be read at any time on the scale 5.

A projecting face 53 which is for example covered with velvet and which is arranged on an inner protective plate 54 of the cover 11, serves as a resilient counter face for the sound-head 50. As will be seen well from Fig. 3, the effacer head pole piece 52 has at least twice the width of the sound head pole piece 51 and projects in the direction of movement of the sound head beyond the sound head pole piece, so that it covers, apart from the sound track worked upon by the sound head pole piece, the subsequent track as well.

Of course the effacer head is in operation only when a new broadcast is to be recorded, and it has then the task to efface records formerly recorded. The sound-head is supplied with the necessary electrical energy via the flexible cable 55.

In order that the sound head can be adjusted always accurately onto the centre of a sound track, fine-adjustment means are provided for. The spindle shaft is journalled in a threaded bush 56, which is screwed into the partition wall 16. By means of a string-drive 57 which acts rotatingly on the bush 56, the guide spindle 31 and together with the same also the sound head 50 can be adjusted progressively without steps in the axial direction at least one pitch of the threaded spindle.

Figure 4:
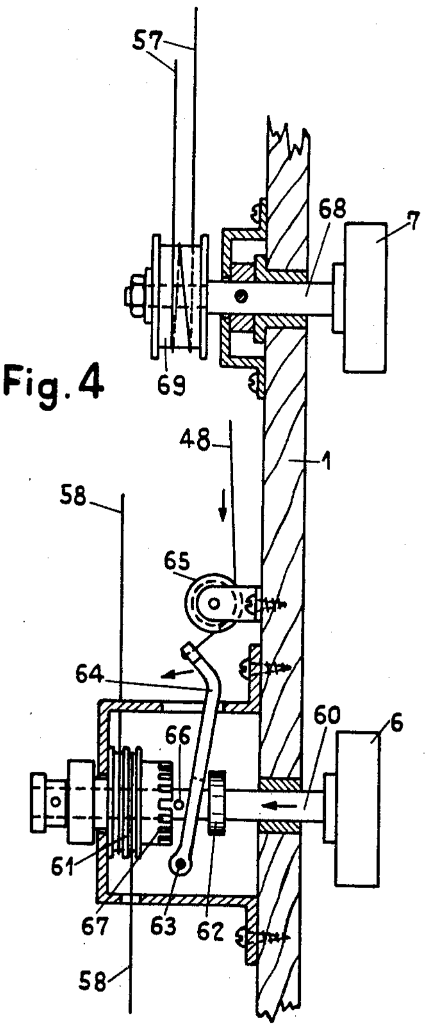
Fig. 4 illustrates the manner of operation of the two operating knobs.

Referring now to Fig. 4, these fine-adjustment means for the sound head carrier are operated by the operating knob 7, on the shaft 68 of which a string drum 69 for the string drive 57 is arranged.

The release means for the sound head carrier 39, i. e. the string-drive 48, and the shifting means for the same, i. e. the string-drive 58, are operated by the operating knob 6. The latter is arranged on a shiftable shaft 60 on which a string pulley 61 is arranged freely rotatable. By shifting the shaft 60 in the direction of the arrow, an annular disc 62 which is fixedly arranged on the shaft 60 acts on a lever arm 64 pivoted at 63 so that the string drive 48 is operated over the roller 65. At the same time a pin 66 which radially projects from the shaft 60 gets into engagement with the castellations of a crown wheel 67, which forms a unit together with the string pulley 61 so that a rotary movement on the knob 6 is transmitted on to the string drive 58 and thereby on to the sound head carrier 39.

Figure 5:
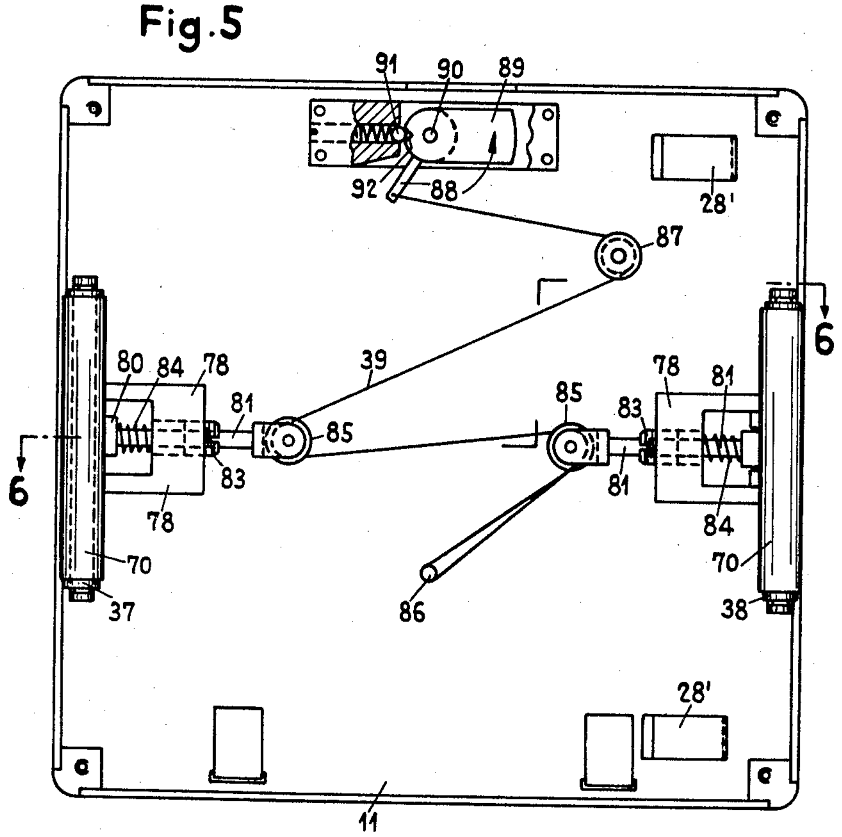
Fig. 5 is a view of the interior of the cover with the protective plate removed.
Figures 6, 7:
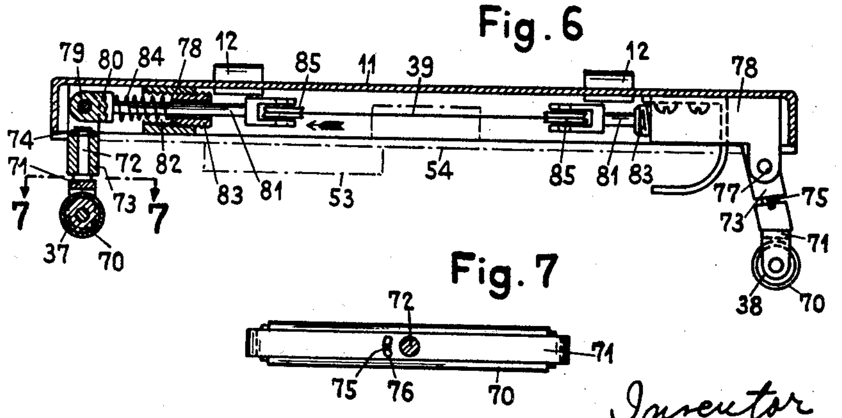
Fig. 6 is a section along the line 6—6 of Fig. 5.
Fig. 7 is a section along the line 7—7 of Fig. 6.

The internal structure of the cover 11 as well as the carrier and adjustment members of the tensioning rollers 37 and 38 are to be seen in Figs. 5 to 7, from which the protective plate 54 has been omitted.

The tensioning rollers 37, 38 which are provided with a rubber layer 70 are each journalled freely rotatable between the legs of a carrier piece 71. The carrier piece 71 is tiltably arranged by means of a pivot 72 on a double lever piece 73. A clamping ring 74 prevents any shifting of the carrier piece 71 in the direction of the pin 72. The tilting range of the carrier piece 71 relative to the levers 73 is limited to an arc of a few degrees by a pin 75 attached to the lever piece 73 which engages into a recess 76 on the carrier piece 71.

The lever piece 73 is tiltably pivoted by means of the pivot bearing 77 on bracket pieces 78, and carries in turn a bearing shaft 79 for the head 80 of a rod 81 which is passed through a bore 82 of the bracket piece 78. In the bore 82 a bush 83 is screwed-in which forms the bearing proper for shifting the rod 81 and which serves as an abutment for a coiled spring 84 which tends to displace the rod 81 in the direction of the arrow, i. e. to hold the tensioning rollers in their tensioning position of Fig. 2. Each rod 81 carries at its free end a freely rotatable string pulley 85. From a holder pin 86 fixed to the cover, a string drive 39 is passed over the two string pulleys 85 and a further pulley 87 to an arm 88 of a catch 89. The catch 89 and the arm 88 which is rigidly connected to it are integral with a pivot pin 90, and in the release position as illustrated in Fig. 5 is arrested by the cooperation of a resiliently mounted thrust ball 91 and a groove 92 in the catch 89. By turning the rotatable handle 13 the parts 88, 89 and 90 are moved out of their rest position, the arm 88 and the catch 89 being tilted 90° in the direction of the arrow. Thereby the catch can come into locking engagement with a suitable member 93 of the gear box 14 in the closed position of the lid (see Fig. 1), and at the same time the string drive 39 is released, so that the tensioning rollers 37 and 38 are rocked, under the action of the springs 84, into their tensioning position, as shown in Fig. 2.

The means described for attaining a friction drive of the sound carrier band starting from a driven roller 19, which means are arranged on a tiltable lid 11 in such a manner that in the closed position of the lid the band 15 is tensioned and is positively carried along by the driven roller through frictional forces, while in the release position of the lid it is set free for being taken out and exchanged, as well as the additional measures mentioned, allow to build an appliance which excels, with a simple structural build-up, through a very reliable safety in operation and handling, and particularly avoids the draw-back of the sprocket-and-perforation drives for the sound band hitherto used, namely the danger of tearing the sound band owing to inaccurate insertion thereof.

What I claim as my invention and desire to secure by Letters Patent, is:

1. In a magnetic record transducing device for recording and reproducing sounds, a casing having mounted therein a driven roller and an idle roller on spaced parallel axes a sound head positioned between said two rollers, a magnetic sound record in the form of an endless band loosely threaded over said rollers and over said sound head so that the latter engages the underside of said endless band, a cover hingedly attached to said casing, and two pressure rollers mounted freely rotatably on the inner face of said cover on two spaced parallel axes and operative to frictionally urge said magnetic sound record in engagement with said driven roller and idle roller respectively, in the closed position of said cover, whereby upon operation of said driven roller said magnetic sound record is moved lengthwise.

2. In a magnetic record transducing device for recording and reproducing sounds, a casing having mounted therein a driven roller and an idle roller on spaced parallel axes, a sound head positioned between said two rollers a magnetic sound record in the form of an endless band loosely threaded over said rollers and over said sound head so that the latter engages the underside of said endless band, a cover hingedly attached to said casing, and two pressure rollers mounted freely rotatably on the inner face of said cover, on spaced parallel axes bearing members for said tensioning rollers adjustably secured to said cover, means for adjusting said bearing members, said tensioning rollers being provided for frictionally urging said magnetic sound record in engagement with said driven roller and idle roller respectively, in the closed position of said cover, whereby upon operation of said driven roller said magnetic sound record is moved lengthwise, and manually operable means on said cover and operative from the exterior of the same to operate said bearing adjusting means for selectively moving said tensioning rollers into a position into and out of engagement with said magnetic sound record when said cover is closed.

3. In a magnetic record transducing device for recording and reproducing sounds, a casing having mounted therein a driven roller and an idle roller on spaced parallel axes, a sound head positioned between said two rollers a magnetic sound record in the form of an endless band loosely threaded over said rollers and over said sound head so that the latter engages the underside of said endless band, a cover hingedly attached to said casing, manually operable means for locking said cover in its closed position, two adjustable bearing members mounted on the inner face of said cover on two spaced parallel axes and operatively connected with said locking means, and pressure rollers freely rotatably supported in said adjustable bearing members, said tensioning rollers in the closed and locked position of said cover urging said magnetic sound record in frictional engagement with said driven roller and idle roller respectively, to cause a movement of said record when the driven roller is operated, while in the unlocked position of said cover the adjustable bearing members are moved by said manually operable means to a position in which the tensioning rollers are disengaged from said magnetic sound record.

4. In a magnetic record transducing device for recording and reproducing sounds, a casing having mounted therein a driven roller and an idle roller on spaced parallel axes, a magnetic sound record in the form of an endless band loosely threaded over said rollers, a magnetic sound head, positioned between said two rollers and engaging the underside of that portion of the endless band moving from the idle roller toward the driven roller; a threaded spindle supporting said sound head and for moving it transversely with respect to the longitudinal direction of the endless sound record, said spindle being mounted between and spaced parallel to said driven and idle rollers, means for drivingly connecting said driven roller with said threaded spindle, a cover hingedly attached to said casing, a support on the inner face of said cover against which a portion of said endless sound record is urged by said sound head when the cover is closed, and two pressure rollers mounted freely rotatably about spaced parallel axes on the inner face of said cover and operative to frictionally urge said magnetic sound record in engagement with said driven roller and idle roller respectively, in the closed position of said cover, whereby upon operation of said driven roller said magnetic sound record is moved lengthwise.

5. In a magnetic record transducing device for recording and reproducing sounds, a casing having mounted therein a driven roller and an idle roller on spaced parallel axes, a magnetic sound record in the form of an endless band loosely threaded over said rollers, a magnetic sound head positioned between said two rollers and engaging the underside of that portion of the endless band moving from the idle roller toward the driven roller, a threaded spindle supporting said sound head and for moving it transversely with respect to the longitudinal direction of the endless sound record, said spindle being mounted between and spaced parallel to said driven and idle rollers, means for drivingly connecting said driven roller with said threaded spindle, a cover hingedly attached to said casing, a support on the inner face of said cover against which a portion of said endless sound record is urged by said sound head when the cover is closed, manually operable means accessible from the exterior of the casing and operatively connected with said magnetic sound head for moving it out of engagement with said magnetic sound record, and two pressure rollers mounted freely rotatably on the inner face of said cover about spaced parallel axes and operative to frictionally urge said magnetic sound record in engagement with said driven roller and idle roller respectively, in the closed position of said cover, whereby upon operation of said driven roller said magnetic sound record is moved lengthwise.

6. In a magnetic record transducing device for recording and reproducing sounds, a casing having mounted therein a driven roller and an idle roller on spaced parallel axes, a magnetic sound record in the form of an endless band loosely threaded over said rollers, a magnetic sound head positioned between said two rollers and engaging the underside of that portion of the endless band moving from the idle roller toward the driven roller, a threaded spindle supporting said sound head and for moving it transversely with respect to the longitudinal direction of the endless sound record, said spindle being mounted between and spaced parallel to said driven and idle rollers, means for drivingly connecting said driven roller with said threaded spindle, a cover hingedly attached to said casing, a support on the inner face of said cover against which a portion of said endless sound record is urged by said sound head when the cover is closed, a single manually operable member accessible from the exterior of the casing and operatively connected with said sound head for moving it out of engagement with said magnetic sound record and out of threaded engagement with said threaded spindle for independent movement relatively to the same, and two pressure rollers mounted freely rotatably on the inner face of said cover about two spaced parallel axes and operative to frictionally urge said magnetic sound record in engagement with said driven roller and idle roller respectively, in the closed position of said cover, whereby upon operation of said driven roller said magnetic sound record is moved lengthwise.

7. In a magnetic record transducing device for recording and reproducing sound, a casing having a vertical partition, a driven roller and an idle roller mounted in horizontal and in parallel spaced relation within said casing, bearings within said vertical partition for supporting one end of said rollers, a box provided with bearings carried by the other end of said rollers, said last named bearing rotatably supporting said other end of said rollers, means forming a support for said box, said support means extending lengthwise below said rollers and attached to said vertical partition, a magnetic sound record in the form of an endless band loosely supported by said driven roller and said idle roller and adapted to be applied and removed from said rollers by moving it transversely to its longitudinal direction over said box at one end of said rollers, a cover hingedly attached to said casing above said driven and idle rollers, and two pressure rollers mounted freely rotatably on the inner face of said cover about two spaced parallel axes and operative to frictionally urge said magnetic sound record in engagement with said driven roller and idle roller respectively, in the closed position of said cover, whereby upon operation of said driven roller said magnetic sound record is moved lengthwise.

8. In a magnetic record transducing device for recording and reproducing sound, a casing having a vertical partition, a driven roller and an idle roller mounted in horizontal and in parallel spaced relation within said casing, a threaded spindle extending parallel to said rollers and between and below the same, a sound head structure mounted on said threaded spindle to be moved by the same along the axis of the same when said spindle is rotated, bearings within said vertical partition for supporting one end of said two rollers and said threaded spindle, a gear box carried by the other end of said two rollers and spindle and having bearings for rotatably supporting the said other ends of said two rollers and spindle, means within said gear box for drivingly connecting said driven spindle with said threaded spindle, a support for said gear box extending below said rollers and spindle and attached to said vertical partition, a magnetic sound record in the form of an endless band loosely supported by said driven roller and said idle roller and adapted to be applied and removed from said rollers by moving it transversely to its longitudinal direction over said box at one end of said rollers, a cover hingedly attached to said casing above said driven and idle rollers, and two pressure rollers mounted freely rotatably on carrier pieces which are mounted for rocking movement on the inner face of said cover, means operative to rock said carrier pieces and cause said tensioning rollers to frictionally urge said magnetic sound record in engagement with said driven roller and idle roller respectively, in the closed position of said cover, whereby upon operation of said driven roller said magnetic sound record is moved lengthwise.

References Cited in the file of this patent

UNITED STATES PATENTS

| | | |
|---|---|---|
| 1,298,909 | De Bersaques | Apr. 1, 1919 |
| 2,111,806 | Ross | Mar. 22, 1938 |
| 2,410,569 | Conant | Nov. 5, 1946 |
| 2,457,699 | Marsen | Dec. 28, 1948 |
| 2,535,480 | Begun | Dec. 26, 1950 |
| 2,568,869 | Rieber | Sept. 25, 1951 |

FOREIGN PATENTS

| | | |
|---|---|---|
| 337,415 | Germany | Mar. 31, 1921 |
| 717,795 | France | Jan. 14, 1932 |
| 618,273 | Great Britain | Feb. 18, 1949 |